United States Patent [19]

Mitchell, Jr.

[11] 4,330,285

[45] May 18, 1982

[54] ORIENTATOR

[76] Inventor: Henry T. Mitchell, Jr., 110 Garrett Ave., Rosemont, Pa. 19010

[21] Appl. No.: 149,052

[22] Filed: May 12, 1980

[51] Int. Cl.³ ............................................. G09B 21/00
[52] U.S. Cl. ............................ 434/113; 273/DIG. 27
[58] Field of Search ..................... 33/1 F, 174 T, 403; 116/205; 273/DIG. 27; 434/85, 90, 112, 113, 430; D7/43, 90, 136

[56] References Cited

U.S. PATENT DOCUMENTS

| | | | |
|---|---|---|---|
| D. 46,530 | 10/1914 | Kennedy | D7/136 |
| 139,237 | 5/1873 | Covell | 434/85 |
| 942,718 | 12/1909 | Dolby | 33/403 |
| 1,821,252 | 9/1931 | Woods | 434/90 X |
| 2,242,607 | 5/1941 | Ehlke | D7/43 |

OTHER PUBLICATIONS

"Protectors For Teflon Pans," p. 49 of Helen Gallagher-Foster House 66–67 Christmas Catalog.

*Primary Examiner*—Harland S. Skogquist
*Attorney, Agent, or Firm*—Steele, Gould & Fried

[57] ABSTRACT

An orientator, for enabling visually handicapped persons to examine objects having projecting details, such as a relief illustration, comprising a grid structure for overlaying the object, having tactilely identifiable reference points distributed thereon, and means for holding the grid structure in a spaced relationship from the object. The tactilely identifiable reference points may define, for example, sectos of a circle or rectangle, or both.

11 Claims, 8 Drawing Figures

ORIENTATOR

BACKGROUND OF THE INVENTION

1. Field of the Invention

This invention relates to the field of orientators, for enabling visually handicapped persons to examine objects having projecting details, such as a relief illustration.

2. Prior Art

In the past, there has been described several items for use by the visually handicapped including: U.S. Pat. No. 2,915,874-Ferguson depicting a clock with tactile indicators; U.S. Pat. No. 2,456,155-Seaman disclosing a device for facilitating the instruction of the Braille alphabet; U.S. Pat. No. 3,536,017-Lucas disclosing a Braille finder for use in conjunction with a manually movable part; U.S. Pat. No. 2,523,828-Howe depicting pictures intended for manual sensing by the visually handicapped; and U.S. Pat. No. 4,073,070-Boston, describing an amusement and instructional coloring book for the visually handicapped. None of these references describe, or utilize, a grid structure for overlaying the object, having tactilely identifiable reference points.

However, a type of overlaying structure is described in U.S. Pat. No. 2,401,105-Richards whose design and use is directed towards persons who impliedly have no visual handicap. There is described a grid formed of two sets of wires at right angles to one another supported by a frame and disposed in the plane of the frame with part of the grid being cut away at its center to form an open space. This open space is designed so that the structure may be placed on a person's face, the nose projecting through the open space. The two sets of wires, therefore, would form a graph to assist or teach an artist front view portrait drawing.

None of the above mentioned devices can be used by visually handicapped persons as an orientator to examine objects having projecting details, such as relief illustrations. Thus, instruction in or descriptions of such objects have been incomplete or inadequate at best.

SUMMARY OF THE INVENTION

It is an object of the present invention to provide a device for orienting a visually handicapped user to segments of an object having projecting details.

It is a further object of the present invention to provide an orientator having a grid structure for overlaying an object with projecting details, having tactilely identifiable reference points.

It is another object of the present invention to provide an orientator that is both relatively light weight and easy to use.

It is a further object of the present invention to provide an orientator having tactilely identifiable reference points defining rectangular and/or circular sectors.

It is a further object of the present invention to provide an orientator having tactilely identifiable reference points located identically to hour indications on a clock.

It is yet another object of the present invention to provide an orientator which is either collapsible or rigid.

These and other objects are accomplished in accordance with the principles of this invention by utilizing a grid structure for overlaying an object having projecting details, which has tactilely identifiable reference points distributed thereon and means for holding the grid structure in spaced relationship from the object.

The tactilely identifiable reference points may be disposed such that rectangular and circular sectors are defined thereby. Additionally, the rectangular and circular sectors may be concentrically disposed with each circular sector being identically located to hour indications on a clock.

The orientator provides sufficiently large spaces to permit physical examination of the overlayed objects.

BRIEF DESCRIPTION OF THE DRAWINGS

For the purposes of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
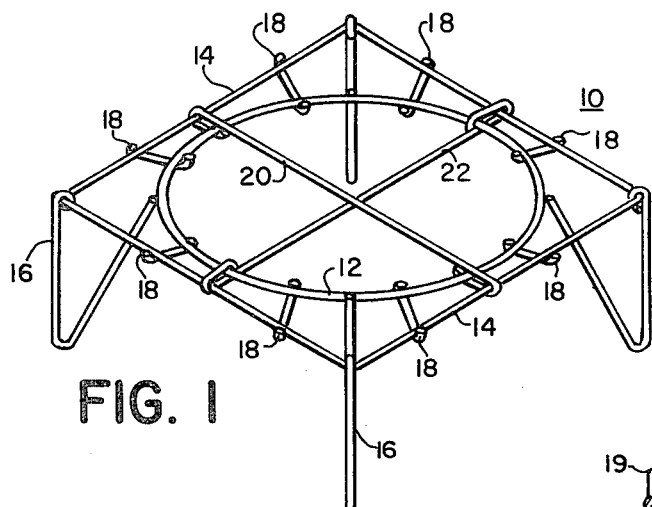
FIG. 1 is a perspective view of the present invention.

An orientator, for enabling visually handicapped persons to examine objects having projecting details, such as relief illustrations, is depicted in FIG. 1 and generally referred to as 10.

The grid structure depicted in FIG. 1 is formed by rectangular member 14 to which other components are attached. Circular member 12 is concentrically contained within rectangular member 14 and attached thereto by double-elbow members 18. Supports 16, as depicted in both FIGS. 1 and 8, are attached to and extend in a plane perpendicular to members 12 and 14.

Figure 2:
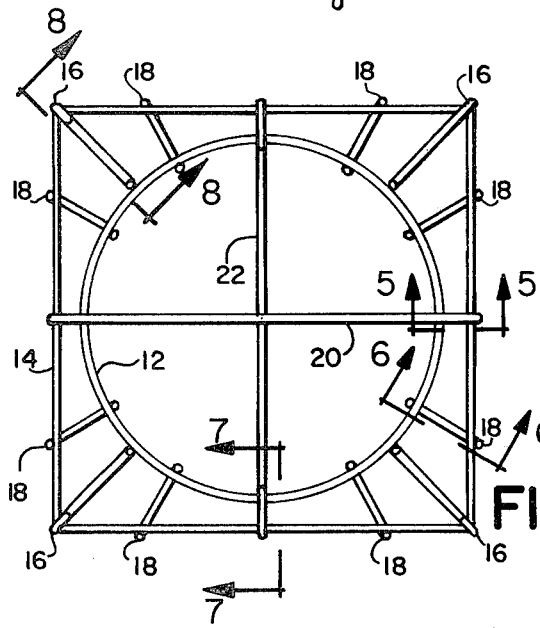
FIG. 2 is a top view of FIG. 1.
Figure 3:
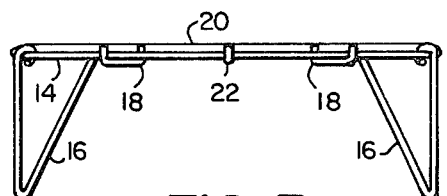
FIG. 3 is a front elevation of FIG. 1.
Figure 6:
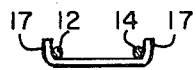
FIG. 6 is a section view along the line 6—6 of FIG. 2.

Double-elbow members 18 are soldered, welded or otherwise suitably attached at regular or spaced intervals. Tactilely identifiable reference points are formed by each end 17 of the double-elbow members 18, as shown in FIG. 6, extending beyond and perpendicular to circular member 12 and rectangular member 14. As can be seen in FIG. 2, a double-elbow member 18 is disposed along the circumference of circular member 12 at hour locations corresponding to: 1:00, 2:00, 4:00, 5:00, 7:00, 8:00, 10:00 and 11 o'clock.

Figure 5:
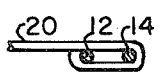
FIG. 5 is a section view along the line 5—5 of FIG. 2.
Figure 7:
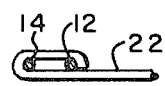
FIG. 7 is a section view along the line 7—7 of FIG. 2.

Cross-hair members 20 and 22 are positioned to intersect at the centers of members 12 and 14. Cross member 20 extends over members 12 and 14, bisecting each. As shown in FIG. 5, member 20 is bent around members 14 and 12, at which point it extends in a direction perpendicular to itself. This formation is identical for both ends of member 20. Cross member 22 extends under members 14 and 12, bisecting each. As shown in FIG. 7, member 22 is bent in a direction opposite member 20, around members 14 and 12 at which point it also extends in a direction perpendicular to itself. The ends of cross-hair members 20 and 22 correspond to the hour locations of 12:00, 3:00, 6:00 and 9 o'clock.

Figure 8:
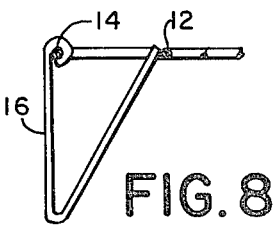
FIG. 8 is a section view along the line 8—8 of FIG. 2.

As shown in FIG. 8, supports 16 are generally V-shaped having one end wrapped around a corner of member 14 and having the other end soldered, welded or suitably attached to circular member 12.

Figure 4:
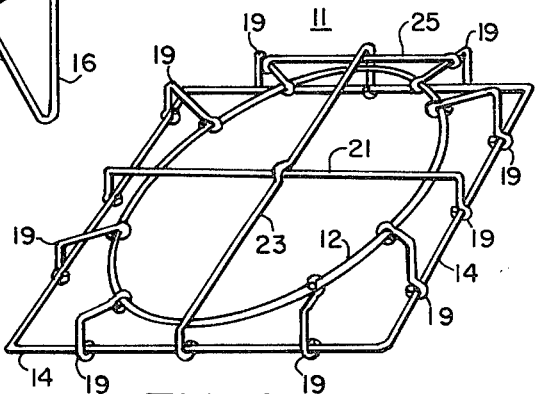
FIG. 4 is a perspective view of an alternative embodiment of the present invention.

FIG. 4 discloses an alternative embodiment of the present invention wherein rectangular member 14 additionally acts as a base for supporting the grid structure. As can be seen, circular member 12 is disposed in a plane parallel to member 14 but in a spaced relationship therefrom. Member 12 is supported by elbow supports 19. In this embodiment, the ends of members 19 wrap around members 12 and 14. Each member 19 is disposed at identical locations to members 18, as shown in FIG. 1.

Cross-hair member 21 bisects over circular member 12 and extends downward to the base rectangular member 14. Cross-hair member 23, unlike the previously described embodiment, extends over circular member 12 and downward allowing attachment to base rectangular member 14. A deformation is provided at the point of intersection of cross-hair members 21 and 23, such that member 21 passes under member 23. There is also provided cross-member 25 whose ends are attached to members 19 positioned at 11:00 and 1:00 respectively. Cross-member 25 can be used to denote, for example, the top. This embodiment is particularly useful in conjunction with a series of relief illustrations having identical borders which can be engaged by member 14.

If either of the above described embodiments are placed over an object having projecting details, such as a relief illustration, a user's fingers may be directed to specific circular or rectangular sectors for investigation. The reverse may also be accomplished. That is a user, whose fingers are extended through the orientator may describe the projecting details of the object being investigated giving reference to specific circular and rectangular sectors.

This invention can be easily constructed from lengths of relatively stiff wire, the connections being secured by soldered joints. Many other means of attachment are possible. The present invention, in forms substantially similar to the described embodiments may also be designed so as to be collapsible, facilitating transportation.

The present invention may be embodied in other specific forms without departing from the spirit or essential attributes thereof, and, accordingly, reference should be made to the appended claims, rather than the foregoing specification as indicating the scope of the invention.

I claim:

1. An orientator, for enabling visually handicapped persons to tactilely examine specific details of three dimensional surfaces which they are otherwise unable to see, in combination with at least one three dimensional relief illustration having structure defining a border, said orientator comprising:

a substantially planar grid structure for overlaying the surface, the grid structure having a first set of members defining relatively large open sectors through which fingers of the hands may be passed in order to feel the surface; and, a second set of members projecting from the periphery of the grid structure perpendicularly to the grid structure plane for engaging the border structure of the at least one relief illustration and for holding the grid structure in a sufficiently spaced relationship from the surface of said illustration to enable the fingers of the hands to move freely between the grid structure and the surface unhampered by the grid structure itself, whereby the attention of the visually handicapped persons can be directed to a specific detail of the at least one relief illustration by a reference to the sector in which it is disposed.

2. The orientator of claim 1, wherein said grid structure is collapsible.

3. The orientator of claim 1, wherein said grid structure is rigid.

4. The orientator of claims 2 or 3, wherein said grid structure is formed from wire.

5. The orientator of claim 1, further comprising a third set of members disposed around the periphery of the grid structure and providing tactilely identifiable reference points which denote portions of sectors.

6. The orientator of claims 1 or 5, wherein the first set of members define a circular grid with four substantially identical wedge-shaped sectors.

7. The orientator of claims 1 or 5, wherein the first set of members define a rectangular grid with four smaller rectangular sectors.

8. The orientator of claim 5, wherein the third set of members comprise structure joining members of the first set which define rectangular and circular sectors.

9. The orientator of claim 5, wherein members of said first, second and third sets of members together form a ring of tactilely identifiable reference points which are spaced equally from one another and located as are the hour indications of a clock.

10. The orientator of claim 6, wherein the first set of members define a rectangular grid with four smaller rectangular sectors.

11. The orientator of claim 10, wherein the whole of said rectangular and circular grids are disposed substantially concentric to one another.

* * * * *